(12) United States Patent
Onuki

(10) Patent No.: US 7,562,992 B2
(45) Date of Patent: Jul. 21, 2009

(54) VEHICLE MIRROR DEVICE

(75) Inventor: Hiroyasu Onuki, Isehara (JP)

(73) Assignee: Ichikoh Industries, Ltd., Tokyo (JP)

( * ) Notice: Subject to any disclaimer, the term of this patent is extended or adjusted under 35 U.S.C. 154(b) by 230 days.

(21) Appl. No.: 11/633,638

(22) Filed: Dec. 5, 2006

(65) Prior Publication Data

US 2007/0146911 A1   Jun. 28, 2007

(30) Foreign Application Priority Data

Dec. 9, 2005   (JP)   ............................. 2005-356301

(51) Int. Cl.
*G02B 7/182*   (2006.01)
*G02B 7/18*   (2006.01)
(52) U.S. Cl. ...................... 359/877; 359/841
(58) Field of Classification Search .......... 359/841, 359/872, 877
See application file for complete search history.

(56) References Cited

U.S. PATENT DOCUMENTS

| 5,594,590 | A | * | 1/1997 | Ishiyama ................... 359/841 |
| 2002/0105740 | A1 | | 8/2002 | Yamauchi | |
| 2004/0109248 | A1 | | 6/2004 | Yoshida et al. | |

FOREIGN PATENT DOCUMENTS

| EP | 0 440 819 A1 | 8/1991 |
| EP | 0 860 323 A2 | 8/1998 |
| JP | 2004-182117 A | 7/2004 |

* cited by examiner

*Primary Examiner*—Alessandro Amari
(74) *Attorney, Agent, or Firm*—Foley & Lardner LLP

(57) ABSTRACT

A holding member includes a bearing that receives a thrust force of at least one of a first gear and a second gear. The first gear and the second gear are in a non-contact state in a thrust direction.

2 Claims, 15 Drawing Sheets

VEHICLE MIRROR DEVICE

CROSS-REFERENCE TO RELATED APPLICATIONS

The present document incorporates by reference the entire contents of Japanese priority document, 2005-356301 filed in Japan on Dec. 9, 2005.

BACKGROUND OF THE INVENTION

1. Field of the Invention

The present invention relates to a vehicle mirror device that includes a rotatable mirror.

2. Description of the Related Art

Vehicle mirror devices with a rotatable mirror have been used. For example, Japanese Patent Application Laid-Open No. 2004-182117 discloses a vehicle mirror device that includes a rotatable first gear and a second gear tiltably coupled to the first gear. With the rotation of the first gear, the second gear is rotated integrally with the first gear to rotate a vehicle mirror.

However, in the conventional vehicle mirror device, the first gear and the second gear are in a contact state in a thrust direction. Therefore, when the mirror is rotated, if a thrust force acts on any one of the first gear and the second-gear, a thrust force of one gear affects the other gear.

SUMMARY OF THE INVENTION

It is an object of the present invention to at least partially solve the problems in the conventional technology.

According to an aspect of the present invention, a vehicle mirror device that includes a rotatable mirror, includes a holding member that includes a bearing member, a first gear that is rotatably supported by the holding member, and a second gear that is rotatably supported by the holding member and tiltably coupled to the first gear to rotate together with the first gear. The bearing member receives a thrust force of at least one of the first gear and the second gear, and the first gear and the second gear are in a non-contact state in a thrust direction.

According to another aspect of the present invention, a vehicle mirror device that includes a mirror rotatable with respect to a vehicle body, includes a shaft that is fixed to the vehicle body, a rotation driving unit that is rotatably supported by the shaft, and a mirror assembly that includes the mirror and is attached to the rotation driving unit. The rotation driving unit includes a holding member that includes a bearing member and is rotatably supported by the shaft and attached with the mirror assembly, a motor that is attached to the holding member, and a rotation-force transmission mechanism that includes a first gear that is rotatably supported by the holding member and a second gear that is rotatably supported by the holding member and tiltably coupled to the first gear to rotate together with the first gear, and drives the motor to rotate the mirror assembly with respect to the shaft. The rotation-force transmission mechanism is located between the motor and the shaft. The bearing member receives a thrust force of at least one of the first gear and the second gear, and the first gear and the second gear are in a non-contact state in a thrust direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

Figure 1:
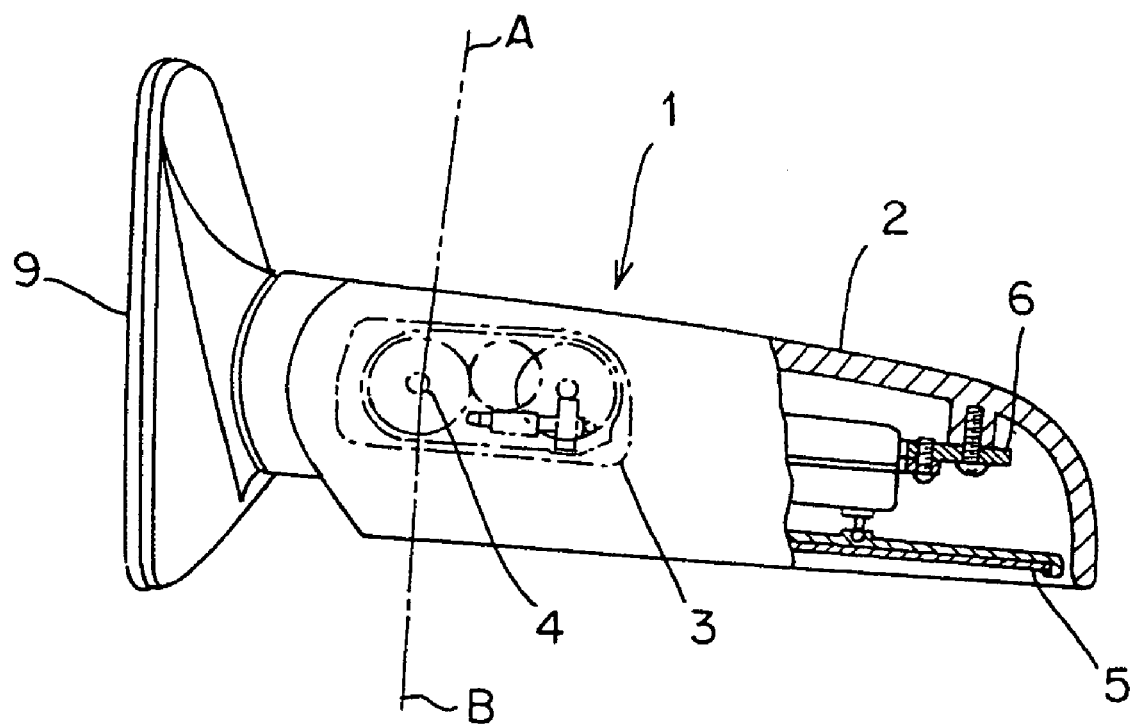
FIG. 1 is a cutaway plan view of a vehicle mirror device according to an embodiment of the present invention.

A structure of a vehicle mirror device 1 according to an embodiment of the present invention is explained referring to FIG. 1. In this embodiment, the vehicle mirror device 1 is, for example, an electric retractable door mirror device. The vehicle mirror device 1 is mounted on each of left and right doors (not shown) of a vehicle. The vehicle mirror device 1 includes a shaft 4, a rotation driving unit (an electric retracting unit) 3, and a mirror assembly 2.

The shaft 4 is fixed to both the left and right doors of the vehicle. The rotation driving unit 3 is rotatably attached to the shaft 4. A mirror 5 is attached to the mirror assembly 2 via an attaching member 6. The mirror assembly 2 is attached to the rotation driving unit 3. When the mirror assembly 2 is rotated around the shaft 4 via the rotation driving unit 3, the mirror 5 rotates with respect to the left and right doors of the vehicle, i.e., a vehicle body.

Figure 2:
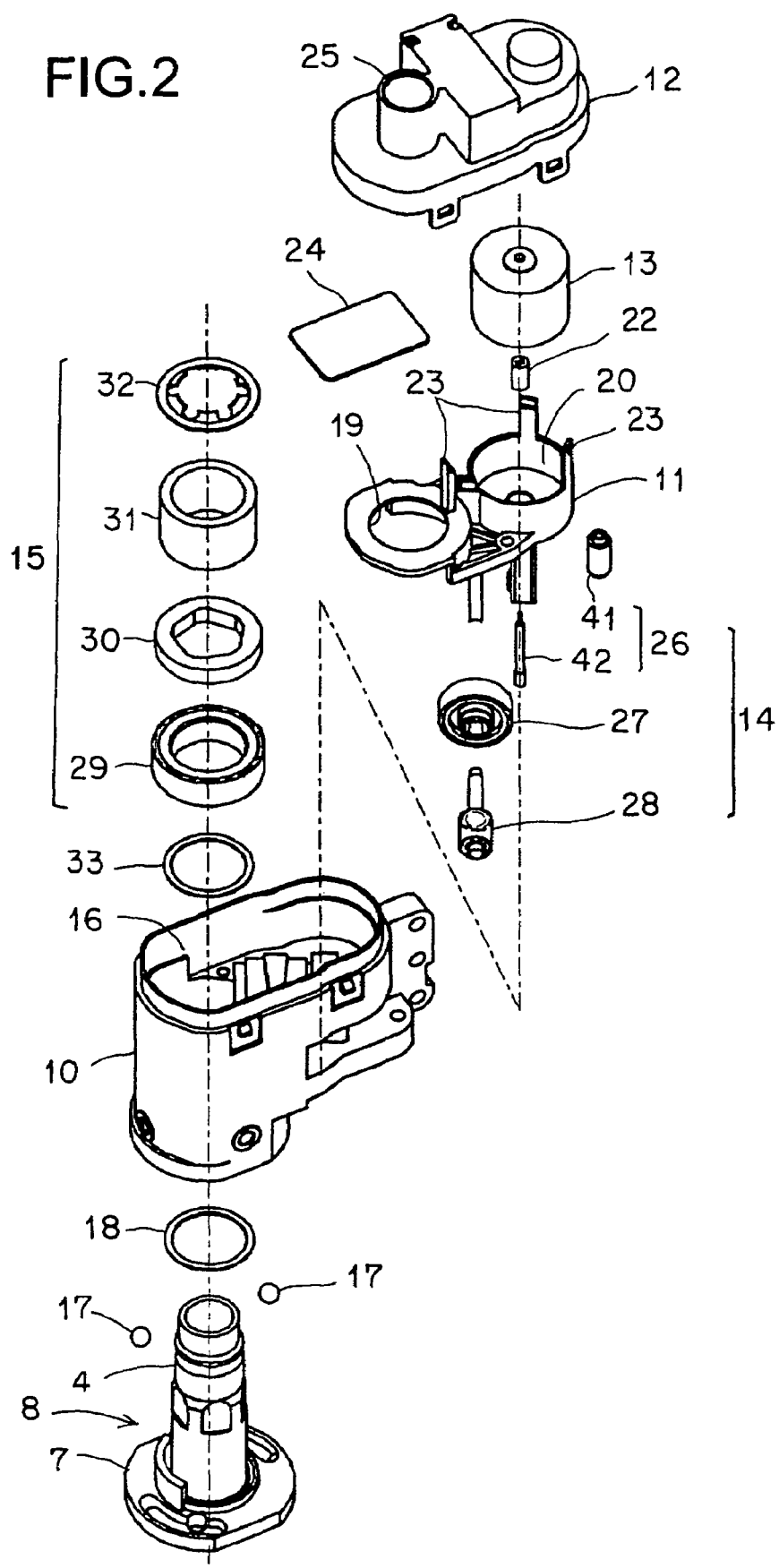
FIG. 2 is an exploded perspective view of an electric retracting unit shown in FIG. 1.
Figure 3A:
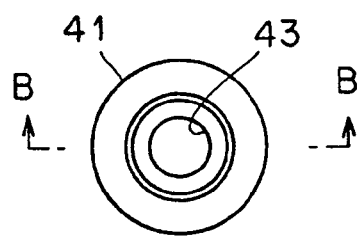
FIG. 3A is a plan view of a gear portion of a first worm gear of the vehicle mirror device.
Figure 3B:
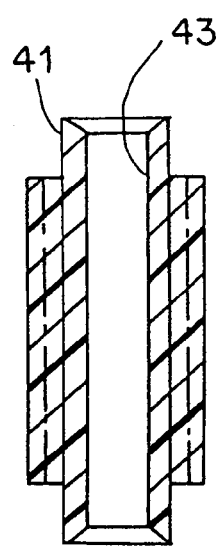
FIG. 3B is a schematic sectional view taken along line B-B in FIG. 3A.
Figure 3C:
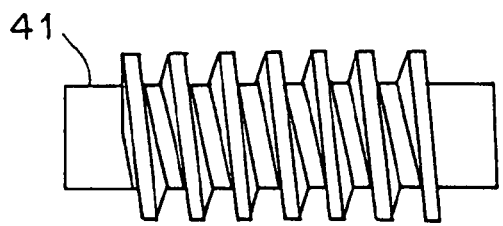
FIG. 3C is a side view of the gear portion of the first worm gear.
Figure 3D:
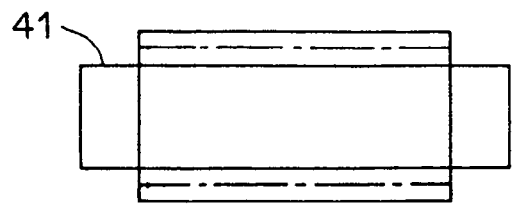
FIG. 3D is a schematic side view of the gear portion of the first worm gear.

As shown in FIG. 2, the shaft 4 is integrally formed with a flange 7 extending vertically thereon. The shaft 4 and the flange 7 constitute a shaft holder 8. The shaft holder 8 is fixed to a mirror base 9 shown in FIG. 1. The mirror base 9 is fixed to the left and right doors of the vehicle. Thus, the shaft 4 is fixed to the left and right door of the vehicle. The shaft 4 is formed in a hollow shape such that a harness (not shown) is inserted through the shaft 4.

The rotation driving unit 3 includes, as shown in FIG. 2, a gear case 10, a plate 11, and a cover 12 as a holding member, a motor 13, and a deceleration mechanism 14 and a clutch mechanism 15 as a rotation-force transmission mechanism.

As shown in FIGS. 2, 9, 10, 14, and 15, the gear case 10 is closed on one side (lower side) with an opening on the other side (upper side) to form a concave in section. The gear case 10 includes the concave as a housing 16. The housing 16 is closed on the shaft holder 8 side with an opening on the plate 11 and the cover 12 side to form a concave in section. An insertion hole (not shown) is formed on the closed side of the gear case 10. The shaft 4 is inserted in the insertion hole. As a result, the gear case 10 is rotatably attached to the shaft 4. A ball 17 and a washer 18 are interposed between the closed side of the gear case 10 and the flange 7 of the shaft holder 8.

As shown in FIG. 2 and FIGS. 7 to 16, the plate 11 has a substantially flat shape to close the opening of the housing 16 of the gear case 10. A circular through hole 19 is formed on one side of the plate 11. A motor housing 20 of a cylindrical shape with an opening on one side (upper side) is formed integrally with the other side of the plate 11. The motor 13 is housed and fitted in the motor housing 20. A concave housing 21 is formed integrally with the bottom of the motor housing 20 at the center. An output shaft (not shown) of the motor 13 and a joint 22 attached to the output shaft are housed in the housing 21. Three base attaching pieces 23 are formed integrally with the edge of the opening of the motor housing 20. A base 24 is attached to the base attaching pieces 23.

The plate 11 is fitted in the opening of the housing 16 to close the opening thereof. The shaft 4 is inserted through the through hole 19 of the plate 11. The plate 11 is fixed to the gear case 10 by a screw or the like (not shown). As a result, the plate 11 is rotatably attached to the shaft 4 together with the gear case 10.

As shown in FIG. 2, the cover 12 is closed on one side (upper side) with an opening on the other side (lower side) to form an inverted concave in section. That is, the cover 12 includes an inverted concave housing (not shown). The housing is opened on the side of the gear case 10 and the plate 11 below the housing and closed on the upper side. A harness-through cylindrical hole 25, which communicates with the through hole 19, is formed integrally with the cover 12. The cover 12 is fitted and fixed to the outside edge of the opening of the housing 16. Thus, the plate 11, the motor 13, the deceleration mechanism 14, the clutch mechanism 15, and the base 24 are housed in the housing 16 covered by the cover 12. The cover 12 is rotatably attached to the shaft 4 together with the gear case 10 and the plate 11.

As shown in FIG. 2, the deceleration mechanism 14 and the clutch mechanism 15 as the rotation-force transmission mechanism are housed in the housing 16 between the output shaft of the motor 13 and the shaft 4. The deceleration mechanism 14 and the clutch mechanism 15 transmit a rotation force of the motor 13 to the shaft 4.

The deceleration mechanism 14 includes a first worm gear 26, a helical gear 27 that meshes with the first worm gear 26, a second worm gear 28 that meshes with the helical gear 27, and a clutch gear 29 that meshes with the second worm gear 28. The first worm gear 26 is coupled to the output shaft of the motor 13 via the joint 22 in the housing 21 of the plate 11.

The clutch mechanism 15 includes the clutch gear 29, a clutch holder 30, a spring 31, and a push nut 32. In the clutch mechanism 15, a washer 33, the clutch gear 29, the clutch holder 30, and the spring 31 are sequentially fitted to the shaft 4. The spring 31 is compressed by the push nut 32. A recess (or projection) formed in the clutch gear 29 engages with a projection (or a recess) formed in the clutch holder 30. By engagement between the second worm gear 28 of the deceleration mechanism 14 and the clutch gear 29 of the clutch mechanism 15, a rotation force of the motor 13 is transmitted to the shaft 4. The spring 31 is a coil spring and shown in FIG. 2 in a simplified form.

The first worm gear 26 includes, as shown in FIGS. 2 to 4B and FIGS. 7 to 10, a gear portion 41 and a pin 42 serving as a shaft. As shown in FIGS. 3A to 3D, a worm gear is provided on the outer surface of a columnar member of the gear portion 41. A circular hole 43 is formed in the center of the gear portion 41 (the columnar member).

Figure 4A:
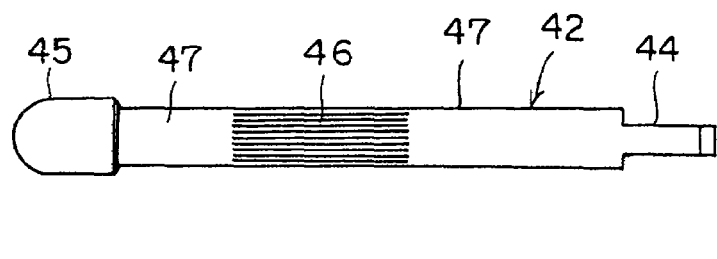
FIG. 4A is a schematic front view of a pin serving as a shaft of the first worm gear.
Figure 4B:
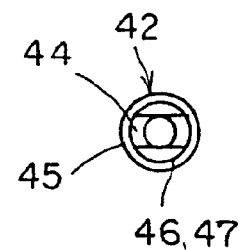
FIG. 4B is a plan view of the pin.

As shown in FIGS. 4A and 4B, the pin 42 is formed by machining a pin member. One end of the pin 42 (the pin member) is chamfered to form a coupling portion 44 including two planes substantially parallel to each other. A supporting portion 45 in a semispherical shape at the end thereof is provided at the other end of the pin 42. A fixing portion 46 formed by parallel knurling is provided at the center of the columnar pin 42. Shaft portions 47 are provided on both sides of the fixing portion 46.

The pin 42 is pressed into the hole 43 of the gear portion 41 from the coupling portion 44 side (see FIG. 8) to interlock and fix the fixing portion 46 of the pin 42 to the inner surface of the hole 43. Thus, the first worm gear 26, which rotates together with the gear portion 41 and the pin 42, is formed (see FIGS. 9 and 10).

Figure 5A:
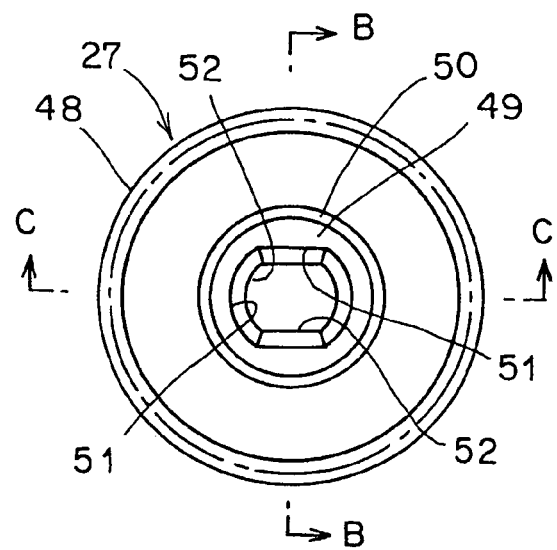
FIG. 5A is a schematic front view of a helical gear as a first gear of the vehicle mirror device.
Figure 5B:
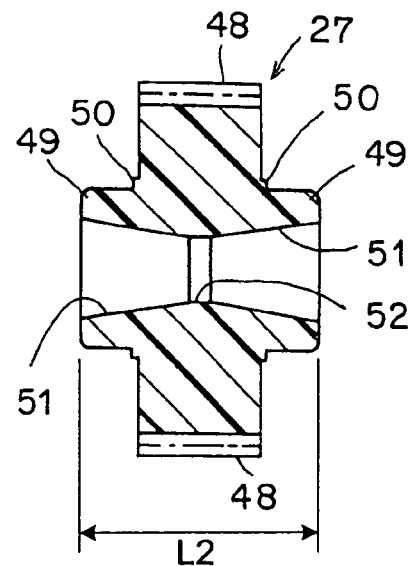
FIG. 5B is a schematic sectional view taken along line B-B in FIG. 5A.
Figure 5C:
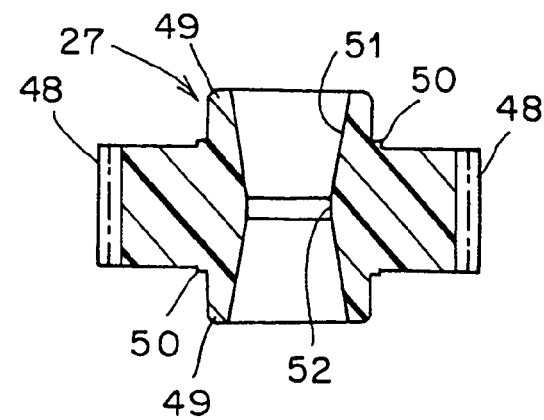
FIG. 5C is a schematic sectional view taken along line C-C in FIG. 5A.

As shown in FIGS. 5A to 5C, the helical gear 27 integrally includes a gear portion 48 and shaft portions 49. The shaft portions 49 are formed integrally with both sides of the gear portion 48 via a step portion 50. The helical gear 27 also includes a through hole 51 in a rotation center direction. On the inner surface in the middle of the through hole 51 is provided a contact portion 52 having two straight sides parallel to each other and being partially in a non-circular shape. The contact portion 52 has a slight width in the rotation center direction. A curved side connects between the parallel two straight sides of the contact portion 52, and forms a part of the circular arc. The inner surface of the through hole 51 is tapered from both the ends toward the middle, i.e., the contact portion 52, to form a drum shape in section.

Figure 6A:
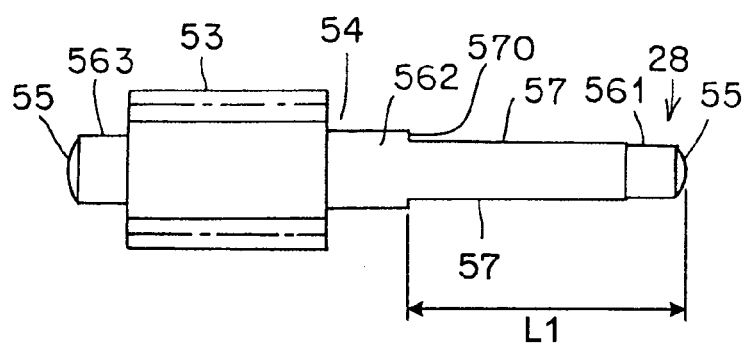
FIG. 6A is a front view of a second worm gear of the vehicle mirror device.
Figure 6B:
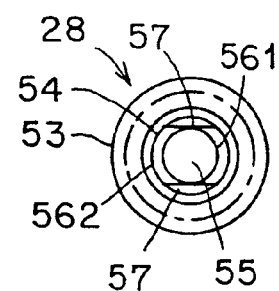
FIG. 6B is a plan view of the second worm gear.

As shown in FIGS. 6A and 6B, the second worm gear 28 integrally includes a gear portion 53 and a rotation shaft 54. Spherical projections 55 are formed integrally with both ends of the rotation shaft 54, respectively. Shaft portions 561, 562, and 563 are formed at both the ends and in the middle of the rotation shaft 54. An outer diameter of the shaft portion 561 at one end is smaller than that of the shaft portion 562 in the middle and the shaft portion 563 at the other end. On an external surface of the rotation shaft 54 between the shaft portion 561 and the shaft portion 562 is provided a contact portion 57 having two plane surfaces parallel to each other and being partially in a non-circular shape. A surface connecting the parallel two plane surfaces of the contact portion 57 forms a part of the columnar shape.

Figure 14:
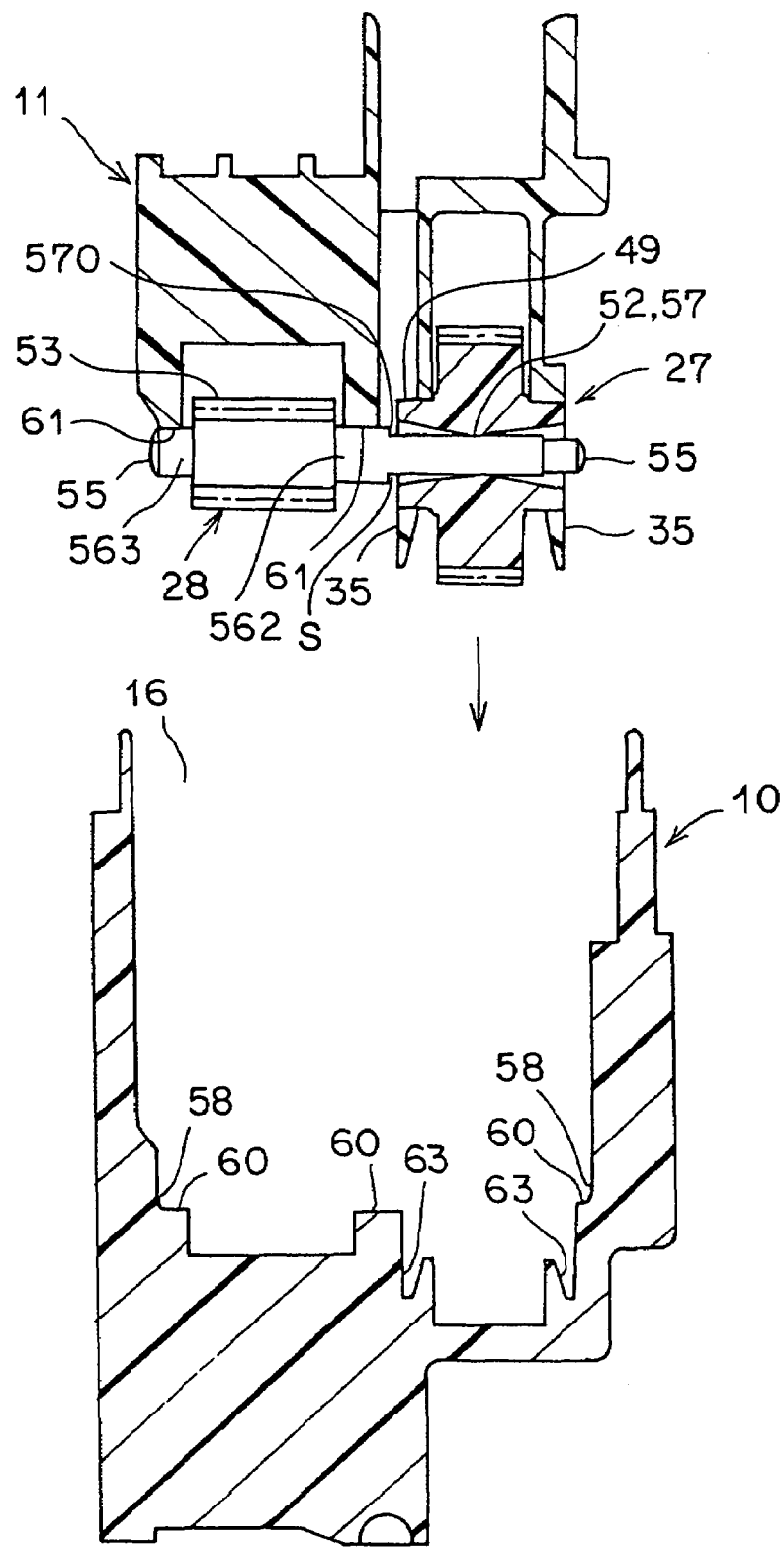
FIG. 14 is a schematic for explaining the process of housing the sub-assembled plate, the first worm gear, the helical gear, and the second worm gear into the gear case.
Figure 15:
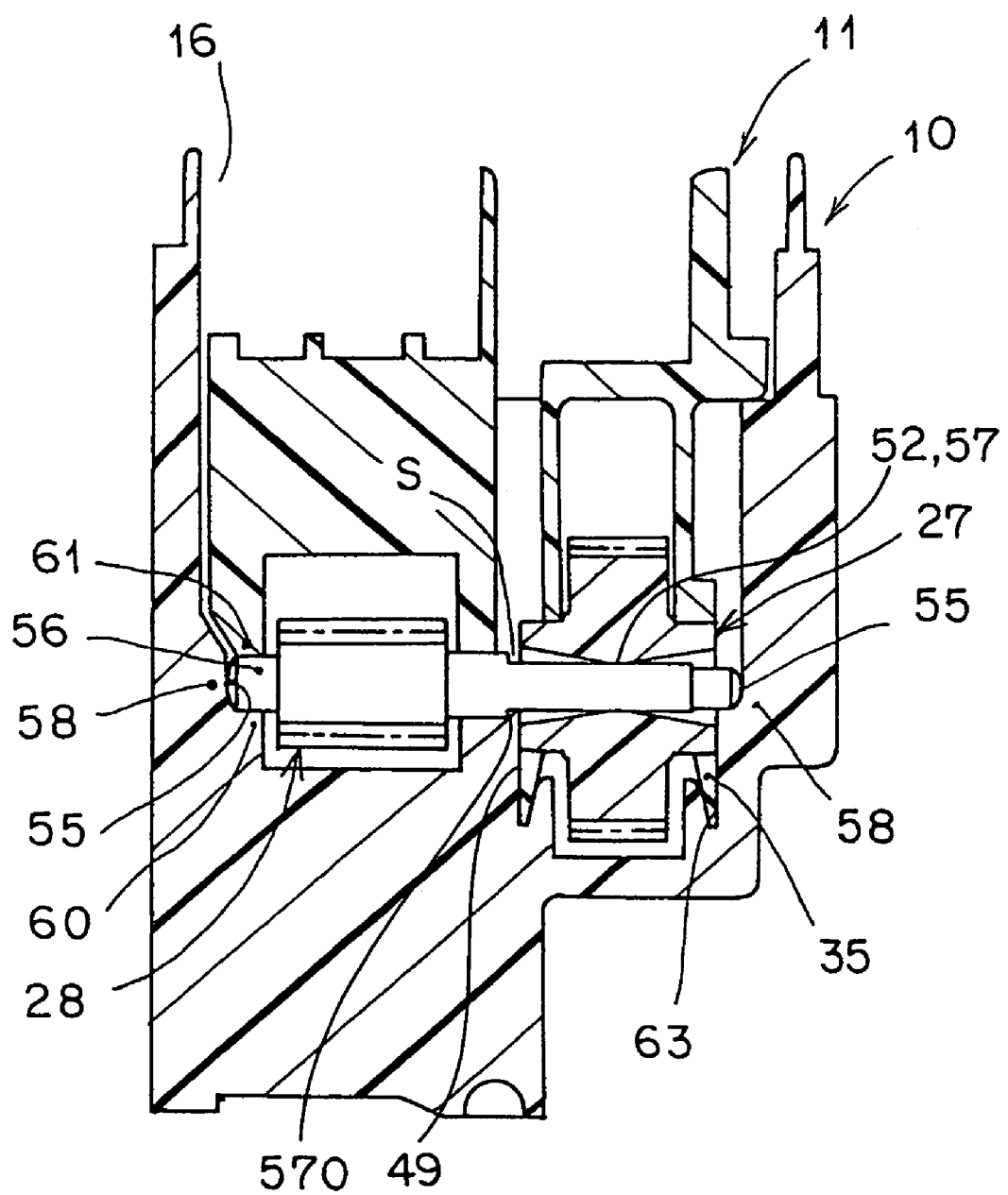
FIG. 15 is a schematic for explaining a state where the first worm gear, the helical gear, and the second worm gear of the deceleration mechanism are housed in the housing.
Figure 16:
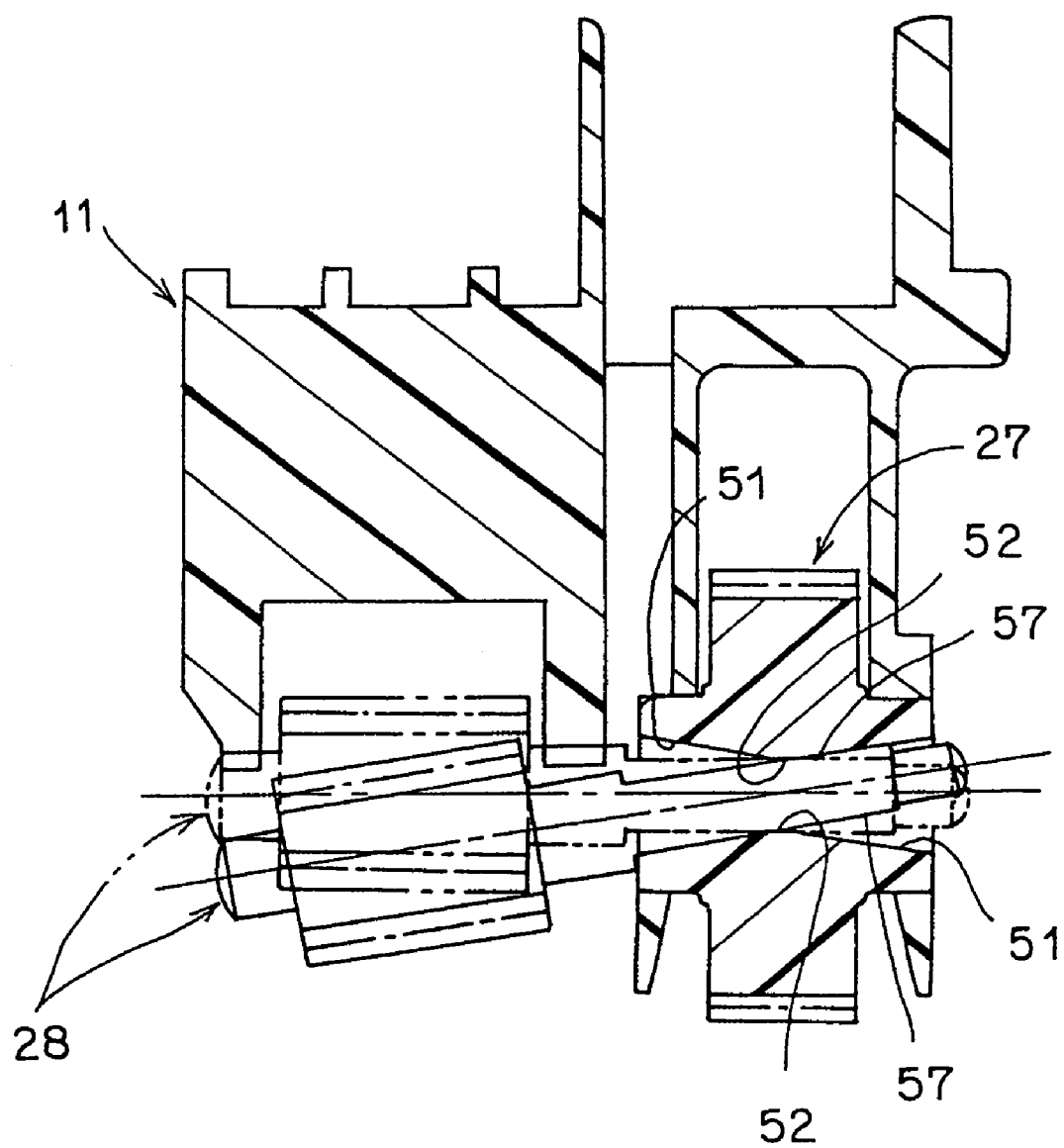
FIG. 16 is a schematic for explaining a state where the second worm gear is inclined with respect to the helical gear.

A distance L1 from one end of the rotation shaft 54 to a step portion 570 between the shaft portion 562 and the contact portion 57 is longer than a distance L2 in the rotation center direction of the shaft portions 49 of the helical gear 27. Consequently, when assembled with each other, the helical gear 27 and the second worm gear 28 are in a non-contact state in a thrust direction. As shown in FIGS. 14 and 15, a gap S is formed between the end faces of the shaft portions 49 of the helical gear 27 and the step portion 570 of the second worm gear 28. The first worm gear 26 and the helical gear 27 constitute a worm gear and a gear. The helical gear 27 and the second worm gear 28 constitute a first gear and a second gear.

A bearing pair 34 and an elastic bearing pair 35 are formed integrally with the plate 11. The plate 11 constitutes one bearing member. As shown in FIGS. 7 to 10, the bearing pair 34 support the shaft portions 47 at both ends of the pin 42 of the first worm gear 26 to be rotatable substantially around a vertical axis. The bearing pair 34 include the bottom of the housing 21 and a portion opposed to the bottom to be vertically spaced apart from the bottom. A vertical space L3 between the bearing pair 34 is larger than a length L4 of the columnar gear portion 41 of the first worm gear 26. Circular through holes 36 are formed in the vertical direction in the bearing pair 34, respectively. A temporary fixing member (a temporary placing member) 37 is provided between the bearing pair 34. The bearing pair 34 and the temporary fixing member 37 are opened on one side (right side in FIGS. 7 to 10) and closed on the other side (left side in FIGS. 7 to 10) to form a concave. An opening 38 is formed in the bottom of the concave, i.e., the temporary fixing member 37. A length L5 of the opening 38 is smaller than the length L4 of the gear portion 41 and larger than a length L6 of the worm gear of the gear portion 41.

As shown in FIGS. 7 to 16, the elastic bearing pair 35 support the helical gear 27 to be rotatable substantially around the horizontal axis. The elastic bearing pair 35 include two elastic plates opposed to each other to be horizontally spaced apart on the lower surface of the plate 11. A horizontal space L7 between the elastic bearing pair 35 is larger than a width L8 of the gear portion 48 of the helical gear 27 and shorter than a length L9 in the rotation center direction of the shaft portions 49. The elastic bearing pair 35 are adjacent to the bearing pair 34 and the temporary fixing member 37 on the left and the right of the bearing pair 34 and the temporary fixing member 37. Circular through holes 39 are formed in the horizontal direction in the elastic bearing pair 35, respectively. The elastic bearing pair 35 have inclined planes 40 from lower sides to the middle of the through holes 39 on opposed surfaces thereof, respectively.

Figure 9:
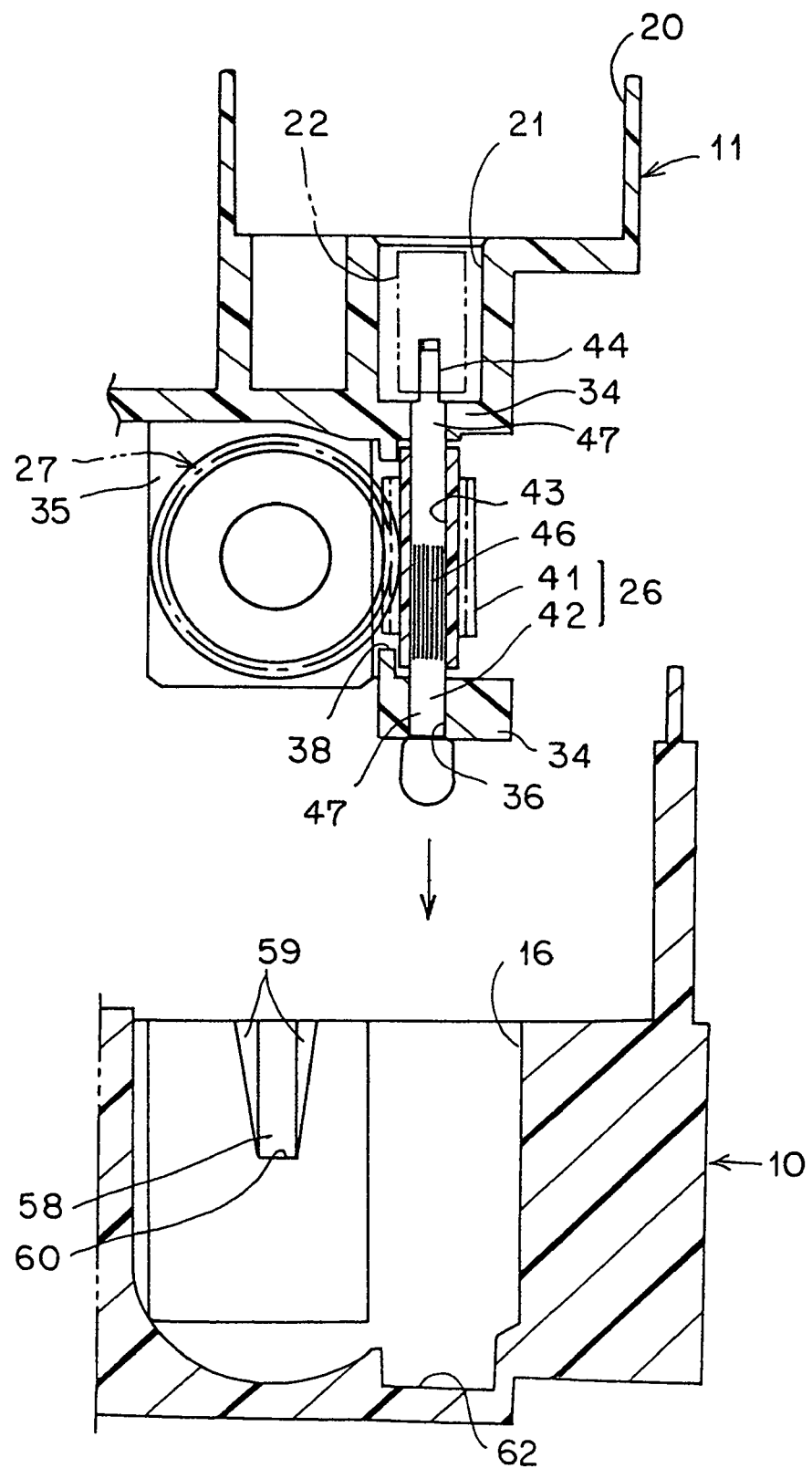
FIG. 9 is a schematic for explaining the process of housing a sub-assembled plate, the first worm gear, the helical gear, and the second worm gear into a gear case.

As shown in FIGS. 9, 14, and 15, thrust bearings 58 that respectively receive thrust forces of the spherical projections 55 at both ends of the rotation shaft 54 are formed in the gear case 10. Specifically, as shown in FIG. 9, the thrust bearings 58 are provided in a lower portion of a guide groove 59 that tapers from the opening to the bottom of the housing 16 of the gear case 10.

Figure 10:
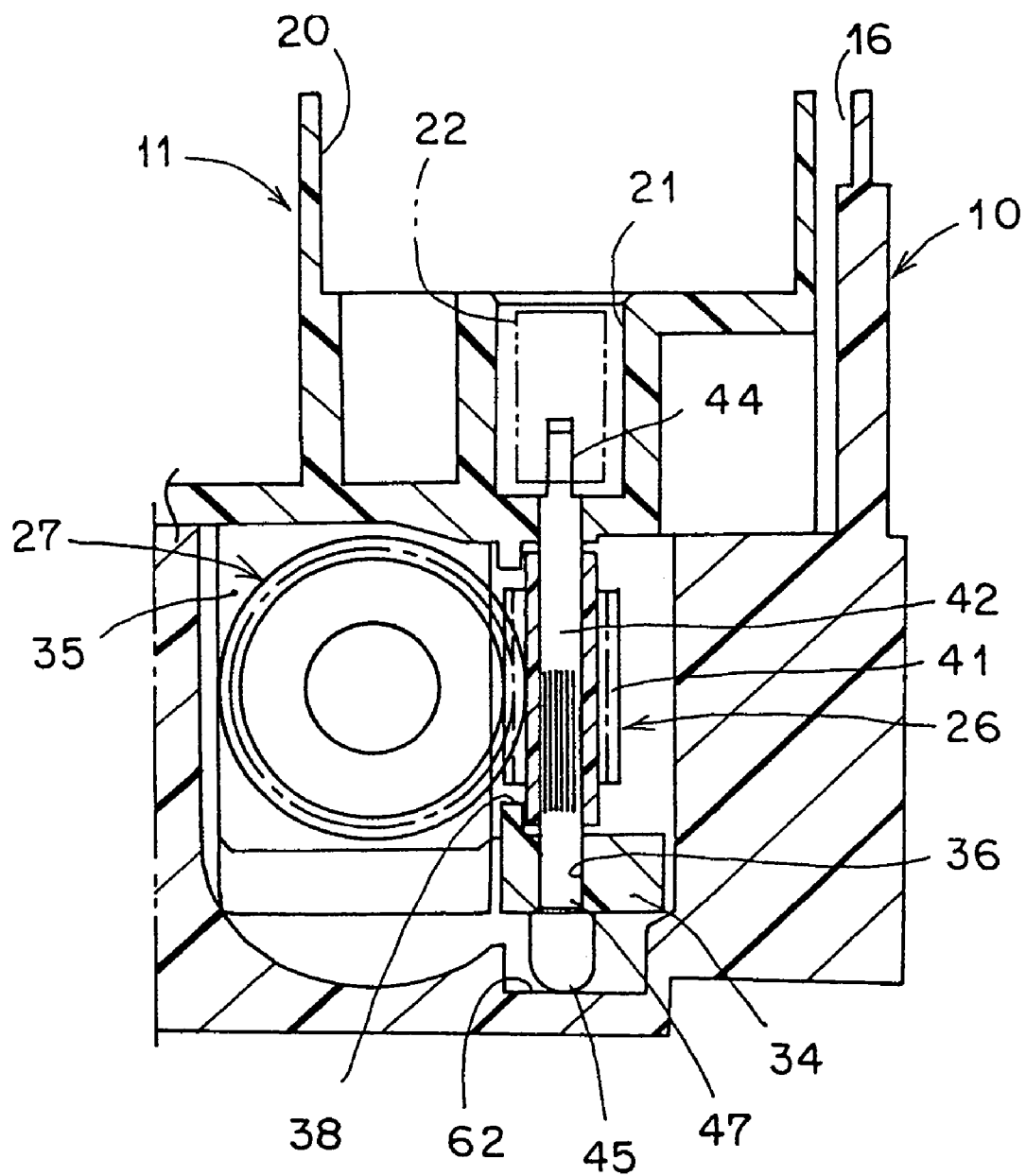
FIG. 10 is a schematic for explaining a state where the first worm gear, the helical gear, and the second worm gear of a deceleration mechanism are housed in a housing partitioned by the gear case and the plate.

As shown in FIGS. 11 to 15, radial bearings 60 and 61 that receive radial forces of the shaft portions 562 and 563 of the rotation shaft 54 are provided in the gear case 10 and the plate 11, respectively. As shown in FIGS. 9 and 10, the gear case 10 includes a receiving portion 62 that receives the supporting portion 45 of the pin 42 of the first worm gear 26. As shown in FIGS. 14 and 15, the gear case 10 also includes grooves 63 in which lower portions having the inclined planes 40 of the elastic bearing pair 35 are inserted. When the lower portions of the elastic bearing pair 35 are inserted in the grooves 63, the elastic bearing pair 35 and the gear case 10 are integrated and reliably support the helical gear 27 without opening and closing the elastic bearing pair 35.

A process of assembling the first worm gear 26, the helical gear 27, and the second worm gear 28 of the deceleration mechanism 14 in the gear case 10 and the plate 11 as the holding member is explained below.

Figure 7:
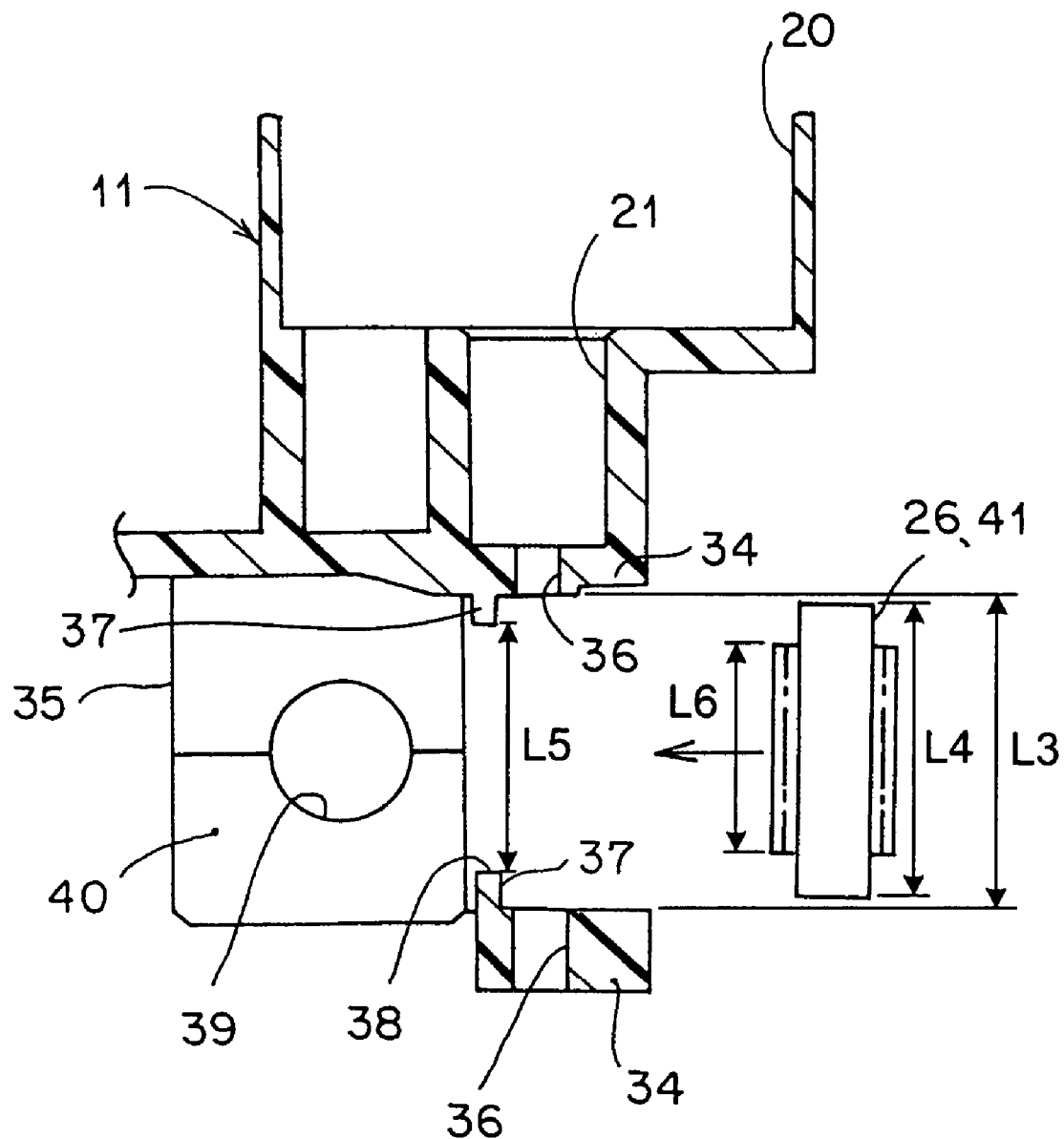
FIG. 7 is a schematic for explaining the process of temporarily fixing the gear portion of the first worm gear to a temporary fixing member of a plate.
Figure 8:
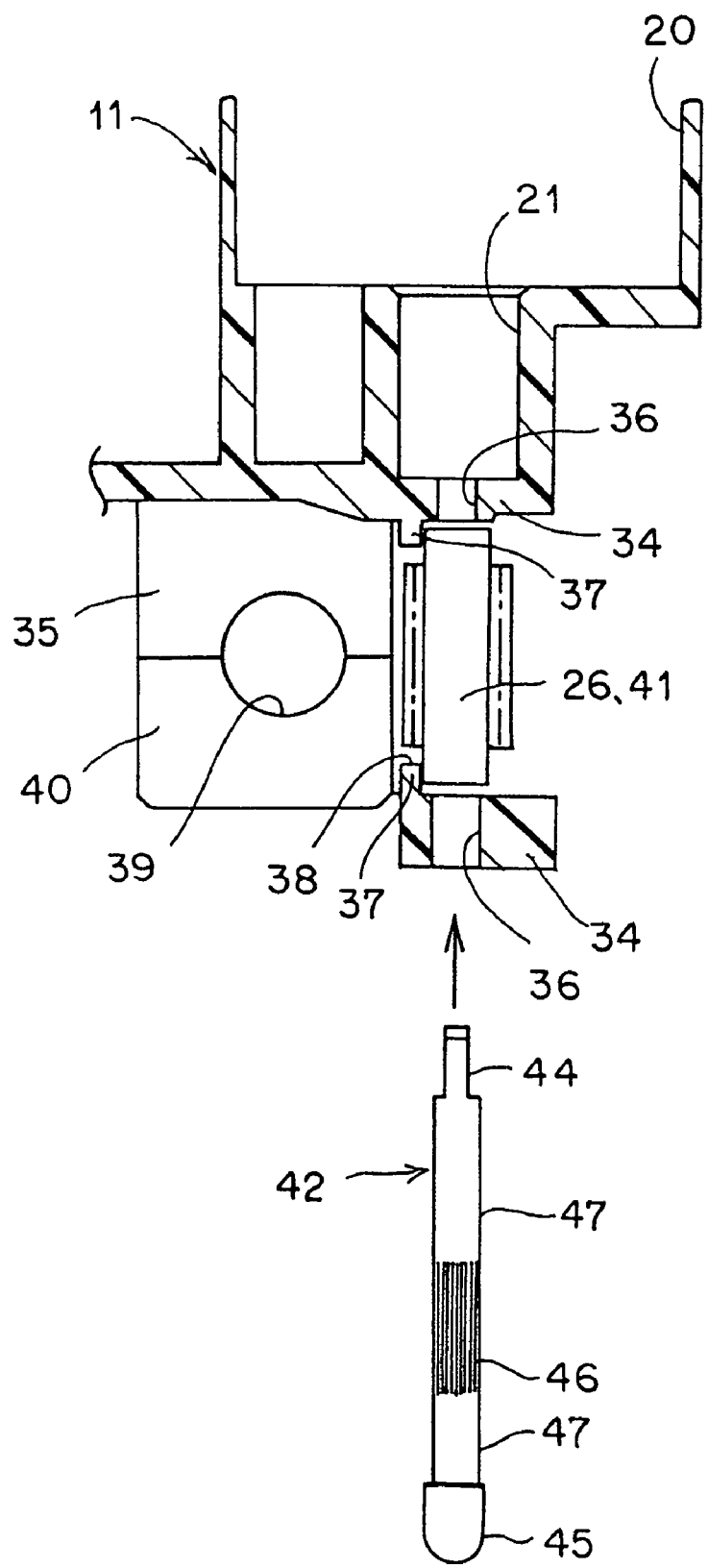
FIG. 8 is a schematic for explaining the process of press-inserting the pin into a hole of the gear portion and a bearing pair of the plate.

As indicated by a solid line arrow in FIG. 7, the gear portion 41 of the first worm gear 26 is set in the bearing pair 34 and the temporary fixing member 37, of the plate 11. Then, as shown in FIG. 8, the gear portion 41 is located between the bearing pair 34 and temporarily fixed (temporarily placed) by the temporary fixing member 37. In other words, the columnar gear portion 41 is temporarily fixed by the temporary fixing member 37 and the worm gear of the gear portion 41 is located in the opening 38. The gear portion 41 can be set easily by dropping the gear portion 41 with the temporary fixing member 37 side (left side of FIGS. 7 and 8) on the lower side.

As indicated by a solid line arrow in FIG. 8, the shaft portions 47 and the fixing portion 46 are press-inserted into the through holes 36 of the bearing pair 34 and the hole 43 of the gear portion 41 from the coupling portion 44 side. Then, as shown in FIG. 9, the shaft portions 47 of the pin 42 are rotatably supported by the bearing pair 34. The fixing portion 46 is interlocked and fixed to the inner surface of the hole 43. Thus, the first worm gear 26 with the gear portion 41 and the pin 42 rotating together is constituted. Consequently, the first worm gear 26 is rotatably supported by the bearing pair 34 of the plate 11.

Figure 11:
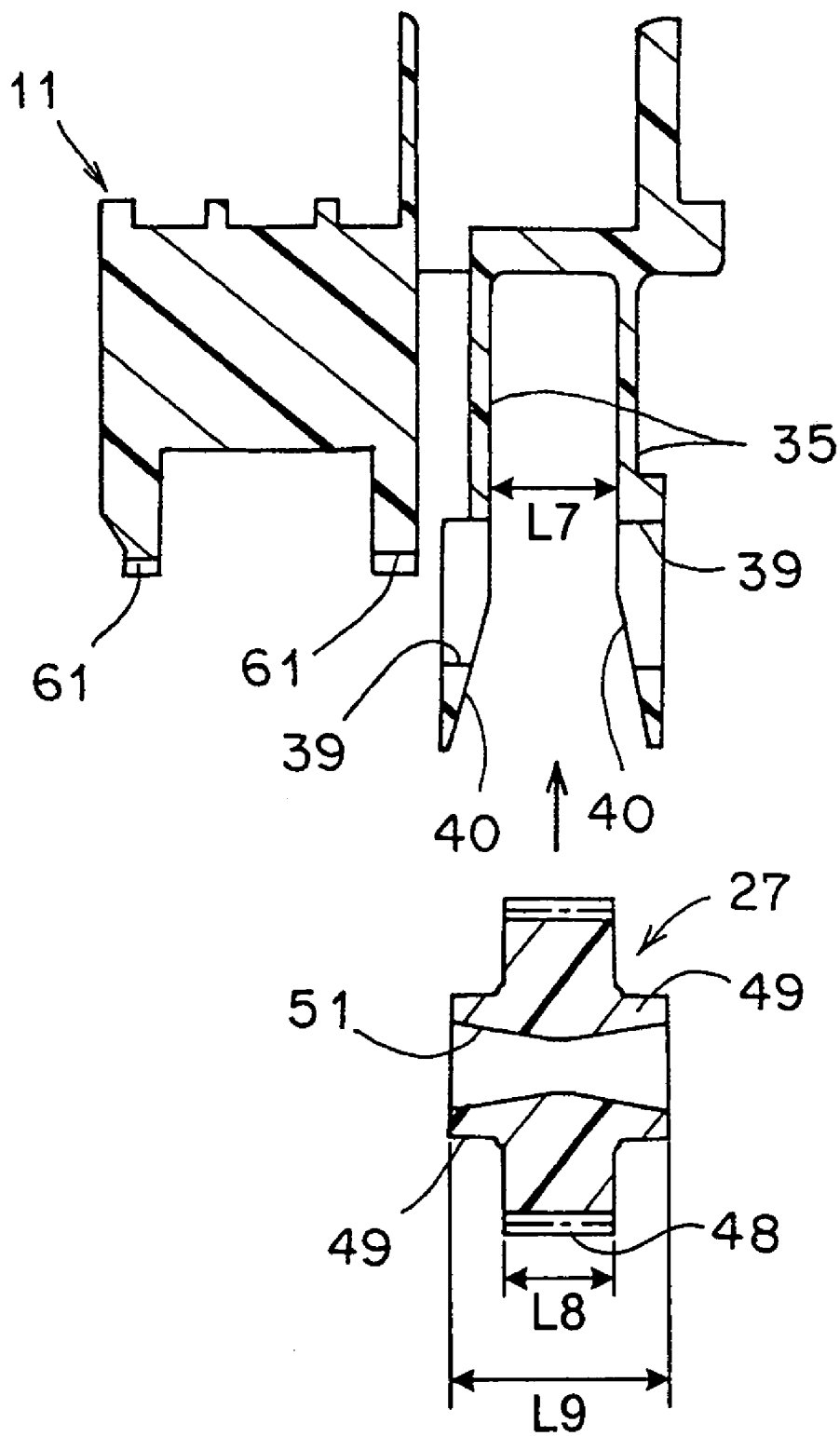
FIG. 11 is a schematic for explaining the process of setting the helical gear between a pair of elastic bearings of the plate.
Figure 12:
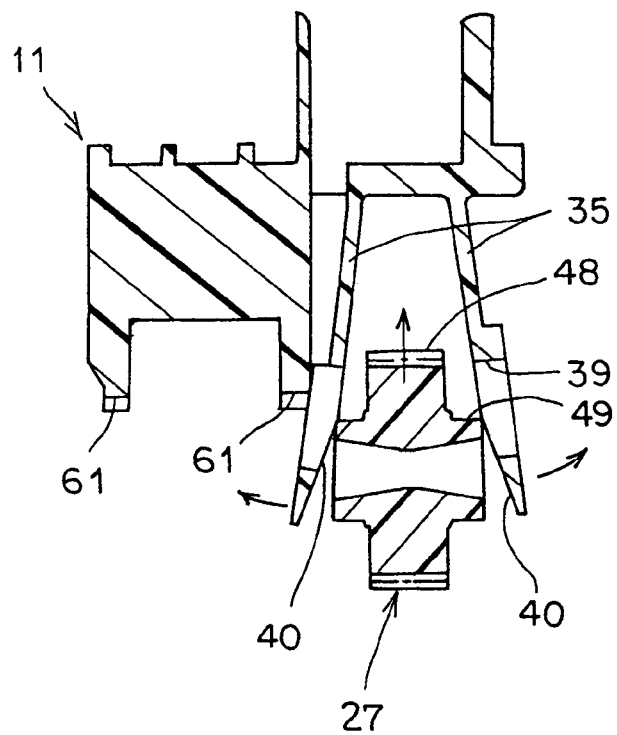
FIG. 12 is a schematic for explaining a state where an elastic bearing pair of the plate is opened outward and elastically deformed with the entrance of the helical gear.
Figure 13:
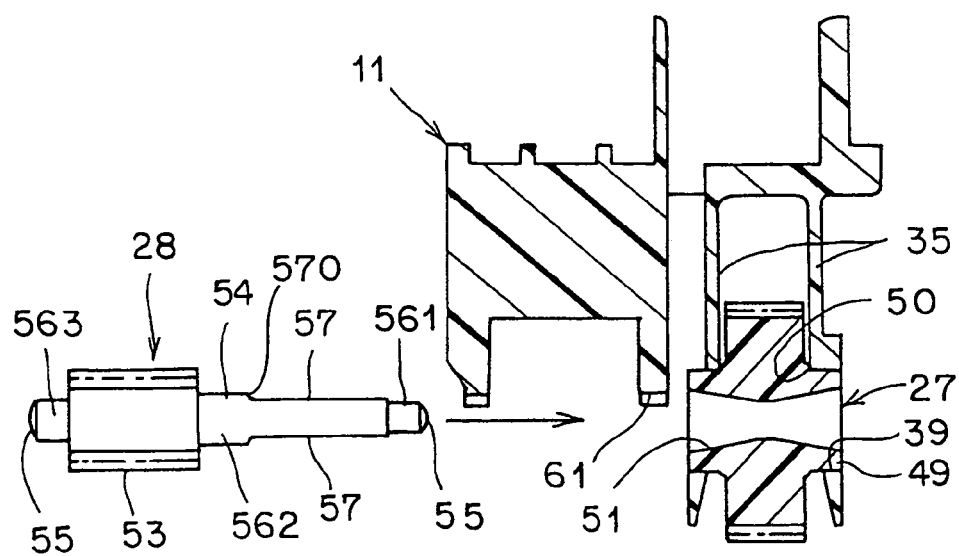
FIG. 13 is a schematic for explaining the process of inserting a rotation shaft of the second worm gear into a through hole of the helical gear supported by the elastic bearing pair.

Subsequently, as indicated by solid line arrows in FIGS. 11 and 12, the shaft portions 49 of the helical gear 27 are opposed to the elastic bearing pair 35. The helical gear 27 is pressed into the space between the elastic bearing pair 35. Then, the shaft portions 49 contact the inclined planes 40 and enter into the space along the inclined planes 40. At this point, as indicated by solid line arrows in FIG. 12, the elastic bearing pair 35 are elastically deformed outward and opened. When the shaft portions 49 reach the through holes 39 of the elastic bearing pair 35 as shown in FIG. 13, the elastic bearing pair 35, which have been elastically deformed outward, elastically return inward and close to the original state. As a result, the shaft portions 49 are inserted into the through holes 39 of the elastic bearing pair 35 that have returned to the original state.

Thus, the gear portion 48 is set between the elastic bearing pair 35. The shaft portions 49 are elastically held and rotatably supported by the elastic bearing pair 35. At this point, as shown in FIGS. 9 and 10, the gear portion 41 of the first worm gear 26 and the gear portion 48 of the helical gear 27 mesh with each other through the opening 38 of the plate 11.

As indicated by a solid line arrow in FIG. 13, the end on the contact portion 57 side of the second worm gear 28 is opposed to the helical gear 27 rotatably supported by the elastic bearing pair 35. At this point, the radial bearings 61 of the plate 11 are located between the helical gear 27 and the second worm gear 28. The rotation shaft 54 (the spherical projection 55, the shaft portion 561, and the contact portion 57) is inserted into the through hole 51 of the helical gear 27. Then, as shown in FIGS. 14 and 15, the contact portion 57 of the rotation shaft 54 and the contact portion 52 of the through hole 51 come into contact with each other.

Consequently, the second worm gear 28 is temporarily held by the helical gear 27. The mutual contact between the contact portion 52 of the helical gear 27 being partially in a non-circular shape and the contact portion 57 of the second worm gear 28 allows the helical gear 27 as the first gear and the second worm gear 28 as the second gear to rotate together. At this point, as shown in FIGS. 14 and 15, the two shaft portions 562 and 563 holding the gear portion 53 of the second worm gear 28 are located in the two radial bearings 61, respectively. A part of the gear portion 53 is housed in the recess between the two radial bearings 61.

In this way, the first worm gear 26 (the worm gear) and the helical gear 27 (the gear) of the deceleration mechanism 14 (the rotation-force transmission mechanism) are rotatably supported by the plate 11 (one bearing member). The second worm gear 28 (the second gear) of the deceleration mechanism 14 is temporarily held by the helical gear 27 (the first gear). Thus, as shown in FIGS. 9 and 14, the first worm gear 26, the helical gear 27, and the second worm gear 28 are sub-assembled with the plate 11.

As indicated by the solid line arrows in FIGS. 9 to 14, the first worm gear 26, the helical gear 27, the second worm gear 28, and the plate 11 sub-assembled each other are set in the housing 16 in a drop-in manner. Then, as shown in FIGS. 10 and 15, the first worm gear 26, the helical gear 27, and the second worm gear 28 sub-assembled with the plate 11 are housed in the housing partitioned by the gear case 10 and the plate 11.

Consequently, the supporting portion 45 of the first worm gear 26 is thrust-supported by the receiving portion 62 of the gear case 10. The elastic bearing pair 35 are inserted into the grooves 63 of the gear case 10. Thus, the shaft portions 49 are reliably supported by the elastic bearing pair 35. In addition, the shaft portions 562 and 563 of the second worm gear 28 are radially supported by the radial bearings 60 of the gear case 10 and the radial bearings 61. The spherical projections 55 at both ends of the second worm-gear 28 are supported by the thrust bearings 58 of the gear case 10.

At this point, the helical gear 27 and the second worm gear 28 are in a non-contact state in the thrust direction. As shown in FIG. 15, the gap S is formed between the end faces of the shaft portions 49 of the helical gear 27 and the step portion 570 of the second worm gear 28.

As described above, the first worm gear 26, the helical gear 27, and the second worm gear 28 of the deceleration mechanism 14 are assembled with the gear case 10 and the plate 11 as the holding member. Then, the motor 13 is attached to the plate 11. The output shaft of the motor 13 and the first worm gear 26 are coupled via the joint 22. The clutch mechanism 15 is assembled with the shaft 4 and the gear case 10. The cover 12 is attached to the gear case 10. Consequently, the rotation driving unit 3 is rotatably attached to the shaft 4. The mirror assembly 2 is attached to the rotation driving unit 3. Thus, the vehicle mirror device 1 as an electric retractable door mirror device is constituted. The shaft 4 is fixed to the left and right doors of the vehicle. Consequently, the vehicle mirror device 1 is mounted on the left and right doors (not shown) of the vehicle.

The vehicle mirror device 1 according to this embodiment is constituted as described above. The operation of the vehicle mirror device 1 is explained below.

First, an in-vehicle switch (not shown) is operated to drive the motor 13. Then, a rotation force of the motor 13 is transmitted to the clutch gear 29 fixed to the shaft 4 via the output shaft, the joint 22, and the deceleration mechanism 14. At this point, the clutch gear 29 is unrotatably fixed to the shaft 4. Therefore, the second worm gear 28 of the deceleration mechanism 14 rotates around the clutch gear 29. This rotation rotates the mirror assembly 2 including the rotation driving unit 3 around the shaft 4. With this rotation, as shown in FIG. 1, it is possible to rotate the mirror assembly 2 between a position for use (a position in the state of FIG. 1) and a retracted position B. When the mirror assembly reaches the position for use or the retracted position B, power supply to the motor 13 is cut off by a switching operation of a switching mechanism (not shown). As a result, the mirror assembly 2 stops at the predetermined position for use and the retracted position B.

When loads are applied to the mirror assembly 2 from the front side or the rear side, the clutch gear 29 rotates against a pressing force of the spring 31. As a result, engagement between the projection and the recess of the clutch gear 29 and the clutch holder 30 is released. Consequently, the mirror assembly 2 rotates due to buffering between the position for use and the retracted position B or between the position for use and a forward inclined position A.

Because the contact portion 52 of the helical gear 27 and the contact portion 57 of the second worm gear 28 contact with each other, the helical gear 27 as the first gear and the second worm gear 28 as the second gear can rotate together. As a result, the rotation force is transmitted between the helical gear 27 and the second worm gear 28.

The inner surface of the through hole 51 is tapered from both the ends toward the middle. Therefore, when the rotation force of the motor 13 is transmitted to the shaft 4 via the deceleration mechanism 14 and the clutch mechanism 15, the second worm gear 28 can incline from a normal state indicated by an alternate long and two short dashes line to a state indicated by a solid line in FIG. 16. On this occasion, because the inner surface of the through hole 51 is tapered from both the ends toward the middle, even if the second worm gear 28 inclines with respect to the rotation center, this does not affect the helical gear 27.

As set forth hereinabove, according to an embodiment of the present invention, the vehicle mirror device 1 includes the thrust bearings 58 that receive thrust forces of the spherical projections 55 at both ends of the rotation shaft 54 of the second worm gear 28 as the second gear. The helical gear 27 as the first gear and the second worm gear 28 are in a non-contact state in the thrust direction. That is, as shown in FIG. 15, the gap S is formed between the end faces of the shaft portions 49 of the helical gear 27 and the step portion 570 of the second worm gear 28. As a result, when the mirror 5 is rotated with respect to the vehicle body (the door) via the mirror assembly 2, even if a thrust force acts on the second worm gear 28, a thrust force of the second worm gear 28 does not affect the helical gear 27. Consequently, the mirror assembly 2 (the mirror 5) can smoothly and reliably rotate. Therefore, the helical gear 27 does not need high strength. Accordingly, it is possible to reduce manufacturing cost and improve durability performance of the helical gear 27. In particular, when a force of an input from the second worm gear 28 is large, this effect is large.

Moreover, the inner surface of the through hole 51 is tapered from both the ends toward the middle. Thus, even if the helical gear 27 or the second worm gear 28 inclines with respect to the rotation center, this does not affect the second worm gear 28 or the helical gear 27. Therefore, noise is prevented and durability performance is improved. Additionally, because of the shape of the inner surface of the through hole 51, the rotation shaft 54 can be easily inserted into the through hole 51. Therefore, it is easy to assemble the helical gear 27 and the second worm gear 28 and assembly work is improved.

Furthermore, a slight gap allowing the helical gear 27 and the second worm gear 28 to rotate together is formed between the contact portion 52 of the helical gear 27 and the contact portion 57 of the second worm gear 28. That is, positions of the helical gear 27 and the second worm gear 28 are not regulated by each other. Consequently, a radial force of the second worm gear 28 does not affect the helical gear 27. Further, the dimension of the through hole 51 and the rotation shaft 54 need not be highly accurate, which reduces manufacturing cost.

Moreover, the vehicle mirror device 1 includes the bearing pair 34 formed integrally with the plate 11 as one bearing member, and the first worm gear 26, as at least one gear of the rotation-force transmission mechanism, including the gear portion 41 and the pin 42 as the shaft portion. The gear portion 41 is set between the bearing pair 34, and the pin 42 is press-inserted and rotatably fixed to the bearing pair 34 and the gear portion 41. Besides, the vehicle mirror device 1 includes the elastic bearing pair 35 formed integrally with the plate 11, and the helical gear 27, as at least one gear of the rotation-force transmission mechanism, including the gear portion 48 and the shaft portions 49. The gear portion 48 is set between the elastic bearing pair 35, and the shaft portions 49 is elastically and rotatably held by the elastic bearing pair 35. The first worm gear 26 and the helical gear 27 that meshes with the first worm gear 26 are thereby rotatably supported by the bearing pair 34 and the elastic bearing pair 35 of the one plate 11, respectively. Therefore, the rotation center axes of the first worm gear 26 and the helical gear 27 is accurately located. Thus, it is possible to reliably prevent rotation fluctuation and inclination of the first worm gear 26 and the helical gear 27. Consequently, a pitch between the axes of the first worm gear 26 and the helical gear 27 is stabilized. This reduces operation noise, and improves a product value and durability performance. In addition, the first worm gear 26 and the helical gear 27 can be sub-assembled with the plate 11. As a result, efficiency of assembling the deceleration mechanism 14 as the rotation-force transmission mechanism and the gear case 10 and the plate 11 as the holding member is improved.

Furthermore, dimensional accuracy management for the holding member is performed by the one plate 11. Thus, it is possible to reduce cost for the dimensional accuracy management for components and realize a reduction in a schedule for commercialization.

Incidentally, in the embodiment described above, the present invention is applied to the electric retractable door mirror device. However, the present invention can be applied to other vehicle mirror devices including vehicle outside mirror devices such as a vehicle fender mirror device and vehicle inside mirror devices such as an in-vehicle mirror device.

In the above embodiment, the spherical projections 55 at both ends of the rotation shaft 54 of the second worm gear 28 as the second gear are thrust-supported by the thrust bearings 58 of the gear case 10. However, both ends of the rotation shaft (the shaft portion 49) of the helical gear 27 as the first gear can be thrust-supported by the thrust bearing of the holding member. Also, both-ends of the rotation shafts of both the first gear and the second gear can be thrust-supported by the thrust bearing of the holding member.

In the above embodiment, the helical gear 27 as the first gear includes the through hole 51, the inner surface of which is tapered from both the ends toward the middle, and the second worm gear 28 as the second gear includes the rotation shaft 54 inserted into the through hole 51. However, conversely, the through hole can be provided in the second gear and a rotation shaft inserted into the through hole can be provided in the first gear.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A vehicle mirror device that includes a rotatable mirror, the vehicle mirror device comprising:
   a holding member that includes a bearing member;
   a first gear that is rotatably supported by the holding member; and
   a second gear that is rotatably supported by the holding member and tiltably coupled to the first gear to rotate together with the first gear, wherein
   the bearing member receives a thrust force of at least one of the first gear and the second gear, and
   the first gear and the second gear are in a non-contact state in a thrust direction, and wherein
   the first gear includes a through hole in a rotation center direction,
   the second gear includes a rotation shaft to be arranged in the through hole,
   the through hole includes a first contact member at least partially in a non-circular shape at a middle of an inner surface, and the rotation shaft includes a second contact member at least partially in a non-circular shape on an outer surface, so that the first gear and the second gear rotate together, and
   the inner surface of the through hole is tapered from both ends toward the middle to tiltably couple the second gear to the first gear.

2. A vehicle mirror device that includes a mirror rotatable with respect to a vehicle body, the vehicle mirror device comprising:
   a shaft that is fixed to the vehicle body;
   a rotation driving unit that is rotatably supported by the shaft; and
   a mirror assembly that includes the mirror and is attached to the rotation driving unit, wherein the rotation driving unit includes
      a holding member that includes a bearing member, and is rotatably supported by the shaft and attached with the mirror assembly;
      a motor that is attached to the holding member; and
      a rotation-force transmission mechanism that includes a first gear that is rotatably supported by the holding member and a second gear that is rotatably supported by the holding member and tiltably coupled to the first gear to rotate together with the first gear, and drives the motor to rotate the mirror assembly with respect to the shaft, the rotation-force transmission mechanism being located between the motor and the shaft, the bearing member receives a thrust force of at least one of the first gear and the second gear, and the first gear and the second gear are in a non-contact state in a thrust direction, and wherein, the first gear includes a through hole in a rotation center direction,
   the second gear includes a rotation shaft to be arranged in the through hole, the through hole includes a first contact member at least partially in a non-circular shape at a middle of an inner surface, and the rotation shaft includes a second contact member at least partially in a non-circular shape on an outer surface, so that the first gear and the second gear rotate together, and the inner surface of the through hole is tapered from both ends toward the middle to tiltably couple the second gear to the first gear.

* * * * *